US012466225B2

(12) United States Patent
Atkins

(10) Patent No.: US 12,466,225 B2
(45) Date of Patent: Nov. 11, 2025

(54) VEHICLE BODY PANEL ROTATOR

(71) Applicant: Kevin Atkins, Gainesville, TX (US)

(72) Inventor: Kevin Atkins, Gainesville, TX (US)

( * ) Notice: Subject to any disclaimer, the term of this patent is extended or adjusted under 35 U.S.C. 154(b) by 0 days.

(21) Appl. No.: 18/663,230

(22) Filed: May 14, 2024

(65) Prior Publication Data
US 2024/0383292 A1 Nov. 21, 2024

Related U.S. Application Data

(60) Provisional application No. 63/502,990, filed on May 18, 2023.

(51) Int. Cl.
*B60G 7/00* (2006.01)
*B62D 65/02* (2006.01)

(52) U.S. Cl.
CPC .......... *B60G 7/006* (2013.01); *B60G 2200/17* (2013.01); *B60G 2206/50* (2013.01)

(58) Field of Classification Search
CPC ...... B60G 7/00; B60G 7/006; B60G 2200/17; B60G 2206/50; B60G 2206/60; B60G 2206/601; B60G 2206/602; B60G 2206/604; B60G 2206/606; B62D 65/02; B62D 65/022; B62D 65/024; B62D 65/026; B62D 65/06; B62D 65/10; B62D 65/12; B62D 65/14; B62D 65/16; B62D 65/18; B05B 13/02; B05B 13/0228; B05B 13/0285; B05B 13/0292; B05C 13/00; B05C 13/02; B23Q 5/00; B23Q 5/006; B23Q 5/02; B23Q 5/04; B25B 27/00; B25B 27/14; B25B 27/146; B25B 27/20; B25H 1/00; B25H 1/0007; F16M 11/00; F16M 11/04; F16M 11/06; F16M 11/10; F16M 11/12; F16M 11/14; F16M 11/16
USPC .......... 280/124.134; 248/127, 128, 129, 130, 248/176.1, 178.1, 276.1, 278.1; 269/16, 269/17, 37, 45, 71, 74, 76, 79, 104, 296, 269/297, 299
See application file for complete search history.

(56) References Cited

U.S. PATENT DOCUMENTS

| 4,029,308 | A  | 6/1977  | Mathers       |
| 4,577,819 | A  | 3/1986  | Bennett       |
| 5,598,788 | A  | 2/1997  | Jonker        |
| 5,915,742 | A  | 6/1999  | Hung          |
| 7,225,933 | B1 | 6/2007  | Pollock et al.|
| 7,448,606 | B1 | 11/2008 | Johnson       |
| 9,358,564 | B2 | 6/2016  | Deshler       |

(Continued)

FOREIGN PATENT DOCUMENTS

DE 4243082 A1 * 6/1993 ................ F16F 7/04

*Primary Examiner* — Jason D Shanske
*Assistant Examiner* — Daniel M. Keck

(57) ABSTRACT

An apparatus for manipulating a vehicle part. Some embodiments may comprise a first strut comprising a shaft, a second strut comprising a spindle, and a support coupled to the shaft and to the spindle. A mounting beam may be coupled to the support beam. A first mount may be coupled to a first portion of the mounting beam, and a second mount may be coupled to a second portion of the mounting beam. A third mount may be coupled to the support beam. An actuator may be coupled to the shaft and configured to rotate the shaft so that the support beam rotates around the spindle, thereby rotating a vehicle part coupled to the first mount, the second mount, and the third mount.

10 Claims, 6 Drawing Sheets

(56) References Cited

U.S. PATENT DOCUMENTS

| | | |
|---|---|---|
| 10,744,526 B2 | 8/2020 | Johnson |
| 11,040,367 B2 | 6/2021 | Guffey et al. |
| 2009/0184217 A1 | 7/2009 | Sprout |
| 2016/0137315 A1* | 5/2016 | Noel .................. B05B 13/0285 269/17 |

* cited by examiner

VEHICLE BODY PANEL ROTATOR

PRIORITY CLAIM

This application claims the benefit of priority of U.S. Provisional Application No. 63/502,990 filed on May 18, 2023.

TECHNICAL FIELD

The invention set forth in the appended claims relates generally to manipulating vehicle parts for repair or restoration. More particularly, but without limitation, the claimed subject matter relates to systems and apparatuses for manipulating panels for repair or restoration.

BACKGROUND

Vehicle body repair and restoration commonly requires that body panels be painted. Both sides of a panel often require painting, and often must be removed from the rest of the vehicle for painting.

While various techniques for painting body panels are known, improvements to systems, apparatuses, and methods for manipulating body panels can continue to improve efficiency and outcomes.

BRIEF SUMMARY

New and useful systems, apparatuses, and methods for manipulating vehicle parts for repair or restoration are set forth in the appended claims. Illustrative embodiments are also provided to enable a person skilled in the art to make and use the claimed subject matter.

For example, some embodiments comprise an improved painting stand, which can be used to securely support an automobile body panel while allowing the panel to be fully rotated for access to both sides of the panel. Such embodiments can allow use by a single operator.

Some embodiments may comprise adjustable arms that can connect to a panel. An actuator can be configured to rotate the panel. In some embodiments, the actuator may comprise a latch that is spring loaded and configured to slip into a series of holes on a rotating wheel, allowing it to lock in place. The actuator can allow the panel to be locked in at various angles, such as a 90-, 45-, or 180-degree (flat) angle. Some embodiments of the apparatus may comprise a frame, which may be constructed of square tubing of various sizes, cut to proper lengths to adjust to different size panels. In some examples, the apparatus can be adjusted for hoods, trunk lids, and rear hatches on minivans or SUVs.

More generally, some embodiments of an apparatus for manipulating a vehicle part may comprise a first strut comprising a shaft, a second strut comprising a spindle, and a support beam comprising a first end coupled to the shaft and a second end coupled to the spindle. Some embodiments may additionally comprise a mounting beam having a first end and a second end, and the mounting beam may be coupled to the support beam between the first end and the second end. A first mount may be coupled to a first portion of the mounting beam, and a second mount may be coupled to a second portion of the mounting beam. For example, the first mount may be coupled to the mounting beam between the support beam and the first end, and the second mount may be coupled to the mounting beam between the support beam and the second end. A third mount may be coupled to the support beam. The first mount, the second mount, and the third mount may be configured to be coupled to the vehicle part, and the actuator may be configured to rotate the shaft so that the support beam rotates around the spindle, thereby rotating the vehicle part.

Features, elements, and aspects described in the context of some embodiments may also be omitted, combined, or replaced by alternative features. Other features, objectives, advantages, and a preferred mode of making and using the claimed subject matter are described in greater detail below with reference to the accompanying drawings of illustrative embodiments.

BRIEF DESCRIPTION OF THE DRAWINGS

The accompanying drawings illustrate some objectives, advantages, and a preferred mode of making and using some embodiments of the claimed subject matter. Like reference numbers represent like parts in the examples.

DESCRIPTION OF EXAMPLE EMBODIMENTS

The following description of example embodiments provides information that enables a person skilled in the art to make and use the subject matter set forth in the appended claims, but it may omit certain details already well known in the art. The following detailed description is, therefore, to be taken as illustrative and not limiting.

The example embodiments may also be described herein with reference to spatial relationships between various elements or to the spatial orientation of various elements depicted in the attached drawings. In general, such relationships or orientation assume a frame of reference consistent with the orientation of the drawings. However, as should be recognized by those skilled in the art, this frame of reference is merely a descriptive expedient rather than a strict prescription.

Figure 1:
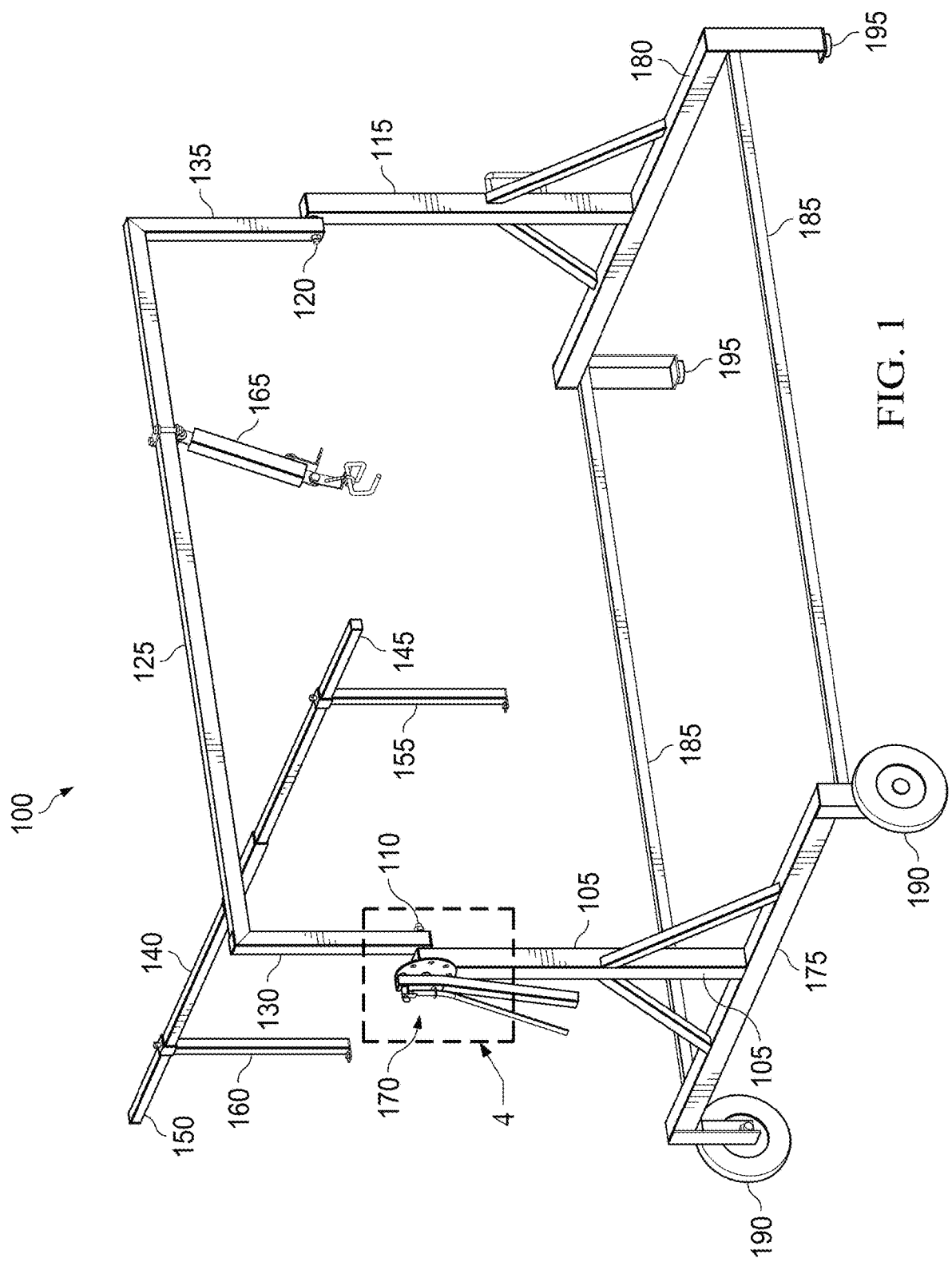
FIG. 1 is a perspective view of an example of an apparatus that can manipulate vehicle parts for repair or restoration.

FIG. 1 is a perspective view of an example of an apparatus 100 that can manipulate vehicle parts for repair or restoration. As illustrated in the example of FIG. 1, some embodiments of the apparatus 100 may include a first strut 105 having a shaft 110, and a second strut 115 having a spindle 120. Additionally, a support beam 125 may have a first end 130 coupled to the shaft 110 and a second end 135 coupled to the spindle 120 in some examples. In the example of FIG. 1, the shaft 110 and the spindle 120 generally define an axis of rotation for the support beam 125. In the apparatus 100 of FIG. 1, a mounting beam 140 is also coupled to the support beam 125. The mounting beam 140 generally comprises a first end 145 and a second end 150. As shown in the example of FIG. 1, the mounting beam 140 may be coupled to the support beam 125 between the first end 145 and the second end 150. In more particular examples, the mounting beam 140 may be coupled to the support beam 125 substantially equidistant from the first end 145 and the second end 150.

The apparatus 100 may additionally comprise a variety of mounts or other attachment mechanisms, which can be configured to couple a vehicle part (not shown in FIG. 1) to the apparatus 100. For example, as shown in FIG. 1, some embodiments of the apparatus 100 may comprise a first mount 155, a second mount 160, and a third mount 165. In more particular examples, the mounts may be configured to couple a vehicle part to the support beam 125, the mounting beam 140, or both. In the apparatus 100 of FIG. 1, the first mount 155 is coupled to a first portion of the mounting beam 140, and a second mount 160 is coupled to a second portion of the mounting beam 140. For example, the first mount 155 may be coupled to the mounting beam 140 between the support beam 125 and the first end 145, and the second mount 160 may be coupled to the mounting beam 140 between the support beam 125 and the second end 150. The third mount 165 may also be coupled to the support beam 125 as shown in the example of FIG. 1. For example, the third mount 165 may be coupled to the support beam 125 between the mounting beam 140 and the second end 135 of the support beam 125. As illustrated in FIG. 1, some examples of the first mount 155, the second mount 160, the third mount 165, or some combination thereof may include drop mounts or extension arms that extend from the support beam 125 and/or the mounting beam 140. In some examples, the mounts may have adjustable lengths.

The apparatus 100 may additionally comprise an actuator 170, which may be coupled to the shaft 110 in some embodiments. For example, the actuator 170 of FIG. 1 is configured to rotate the shaft 110 so that second end 135 of the support beam 125 rotates around the spindle 120.

In some embodiments, the apparatus 100 may additionally comprise a base. For example, the base of FIG. 1 generally comprises a first stabilizer bar 175 coupled to the first strut 105, and a second stabilizer bar 180 coupled to the second strut 115. One or more braces 185 may be coupled to the first stabilizer bar 175 and the second stabilizer bar 180 to provide additional stability. The base may have alternative configurations in some embodiments. For example, the base may be triangular or trapezoidal in some examples. Some embodiments of the apparatus 100 may additionally comprise wheels to improve mobility. For example, the apparatus 100 of FIG. 1 has two wheels 190 coupled to the first stabilizer bar 175. Two rubber feet 195 may be coupled to the second stabilizer bar for stability.

In general, components of the apparatus 100 may be coupled directly or indirectly. For example, attachment mechanisms, such as the first mount 155, may be directly coupled to the mounting beam 140 and may be indirectly coupled to the support beam 125 through the mounting beam 140. Coupling may include mechanical, electrical, or chemical coupling (such as a chemical bond), or some combination of coupling in some contexts. In some embodiments, components may also be coupled by virtue of physical proximity, being integral to a single structure, or being formed from the same piece of material.

Components of the apparatus 100 may be constructed of tubing of various sizes, cut to proper lengths to adjust to different size panels. Tubing having a square cross-section may be advantageous for some embodiments. The components may be constructed of a variety of suitable materials having sufficient rigidity and strength to support the weight of vehicle parts. In some embodiments, for example, steel or polyvinyl chloride may be suitable materials.

In some embodiments, the apparatus 100 may be assembled and disassembled to facilitate manufacturing, shipping, and/or storage. For example, the first stabilizer bar 175 and the second stabilizer bar 180 may be placed on a floor. The braces 185 may then be coupled to the first stabilizer bar 175 and the second stabilizer bar 180. For example, the first stabilizer bar 175 and the second stabilizer bar 180 may each have slots (not shown) configured to receive ends of the braces 185.

Figure 2:
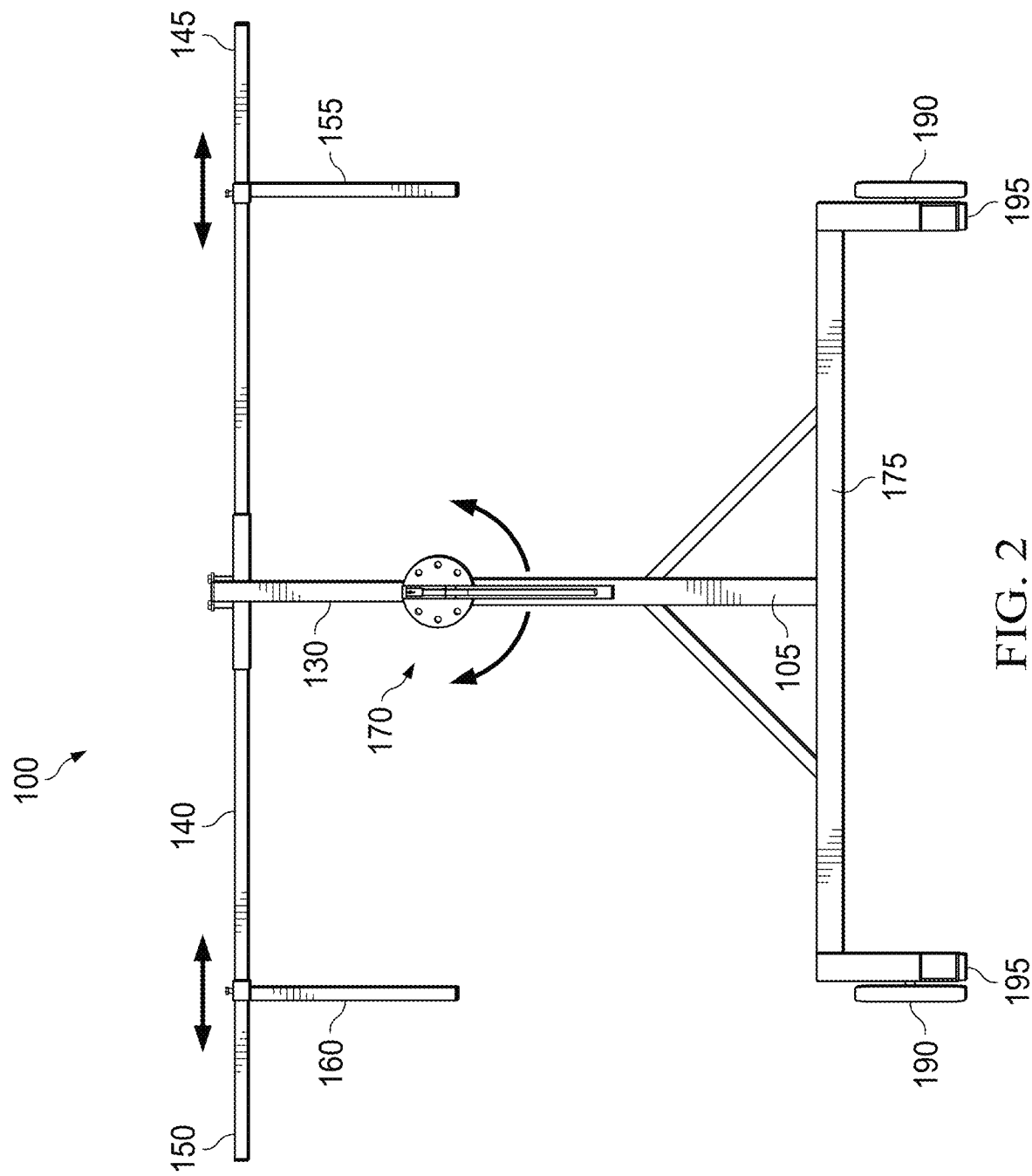
FIG. 2 is a side view of the apparatus of FIG. 1.

FIG. 2 is a side view of the apparatus 100 of FIG. 1, illustrating additional details that may be associated with some embodiments. For example, the first mount 155 and the second mount 160 of FIG. 2 may be configured to slide along the mounting beam 140, which can allow the first mount 155 and the second mount 160 to accommodate vehicle parts of varying dimensions.

Figure 3:
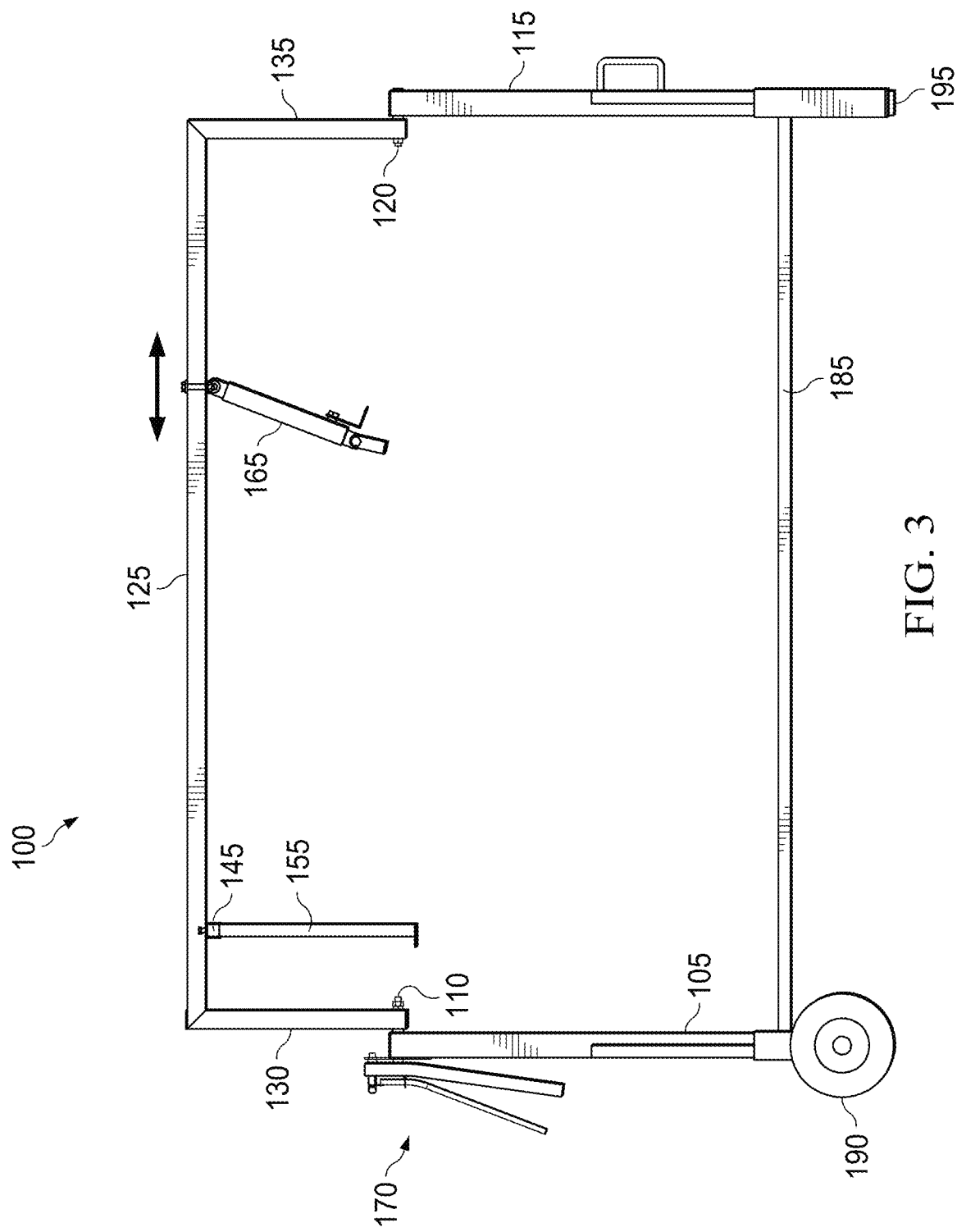
FIG. 3 is a front view of the apparatus of FIG. 1.

FIG. 3 is a front view of the apparatus 100 of FIG. 1, illustrating additional details that may be associated with some embodiments. For example, the third mount 165 of FIG. 3 is configured to slide along the support beam 125, which can allow the third mount 165 to be adjusted to accommodate vehicle parts of different dimensions. Additionally, as illustrated in FIG. 3, some embodiments of the first end 130 and the second end 135 may be substantially parallel to each other and perpendicular to the support beam 125. In some embodiments, the first end 130 and the second end 135 may have adjustable lengths.

Figure 4:
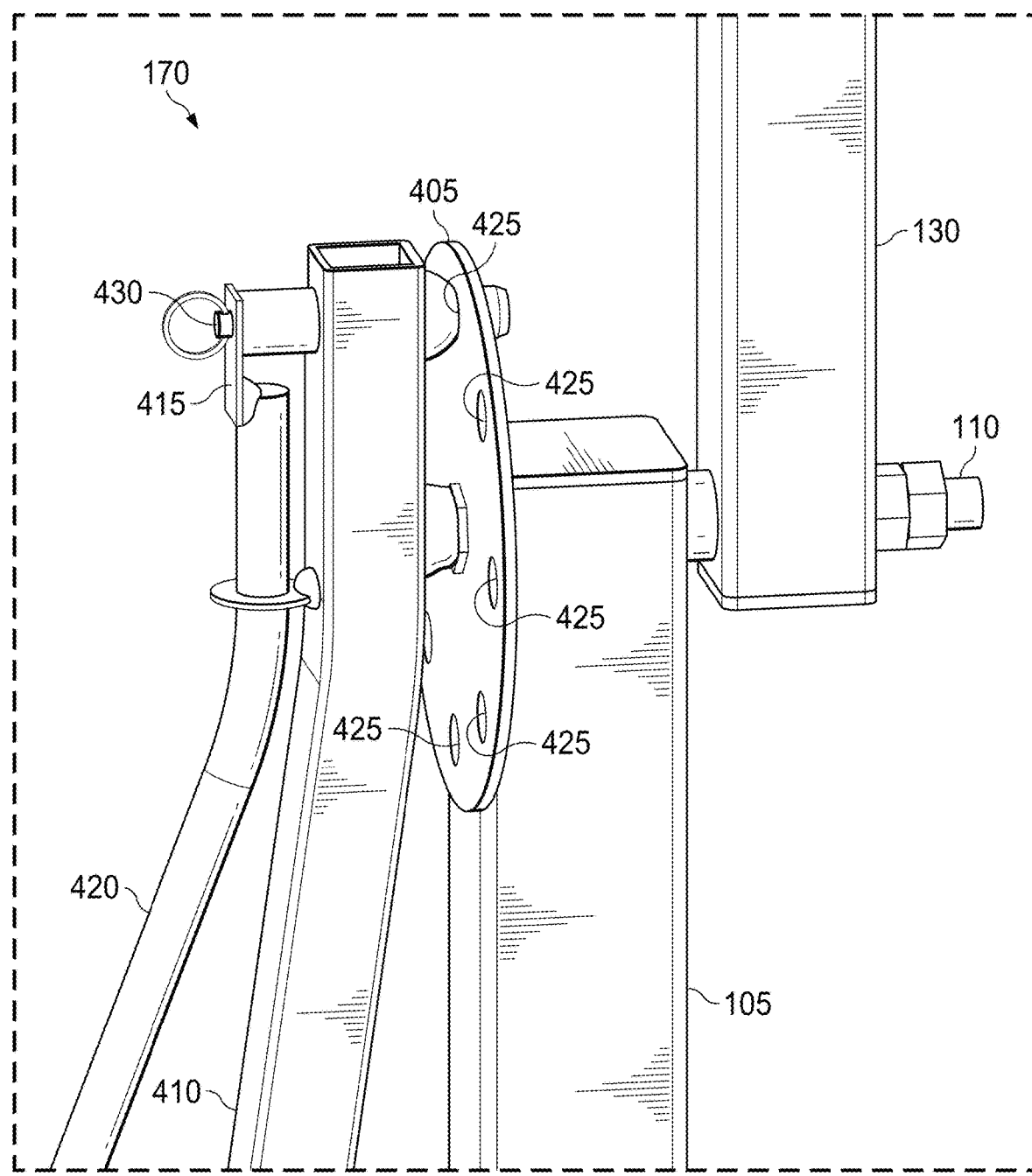
FIG. 4 is a detail view of an actuator associated with the apparatus of FIG. 1.

FIG. 4 is a detail view of the actuator 170 of FIG. 1, illustrating additional details that may be associated with some embodiments. For example, the actuator 170 of FIG. 4 generally comprises a wheel 405, a pivot arm 410, a latch 415, and a lever 420. The wheel 405 may be coupled to the first strut 105, and the pivot arm 410 may be coupled to the shaft 110, which may pass through the first strut 105 and the first end 130 as shown in the example of FIG. 4. The wheel 405 of FIG. 4 may have a plurality of index stops 425, and the latch 415 may be configured to engage the index stops 425 to prevent the pivot arm 410 from rotating the shaft 110. For example, the latch 415 of FIG. 4 can engage a first index stop to lock the support beam 125 in the orientation shown in the example of FIG. 1. In some embodiments, the lever 420 may be configured to remove the latch 415 from the first index stop to allow the pivot arm 410 to rotate the shaft 110 until the latch 415 engages a second index stop. In more particular examples, the latch 415 may comprise an index pin 430, which can be inserted into an index stop. In the example of FIG. 4, the index pin 430 passes through the pivot arm 410. In some embodiments, a spring (not shown) may be configured to bias the index pin 430 toward the wheel 405, in opposition to the force of the lever 420 on the latch 415, so that the spring force can move the index pin 430 into an index stop if the lever 420 is released and the index pin 430 is aligned with the index stop.

Figure 5:
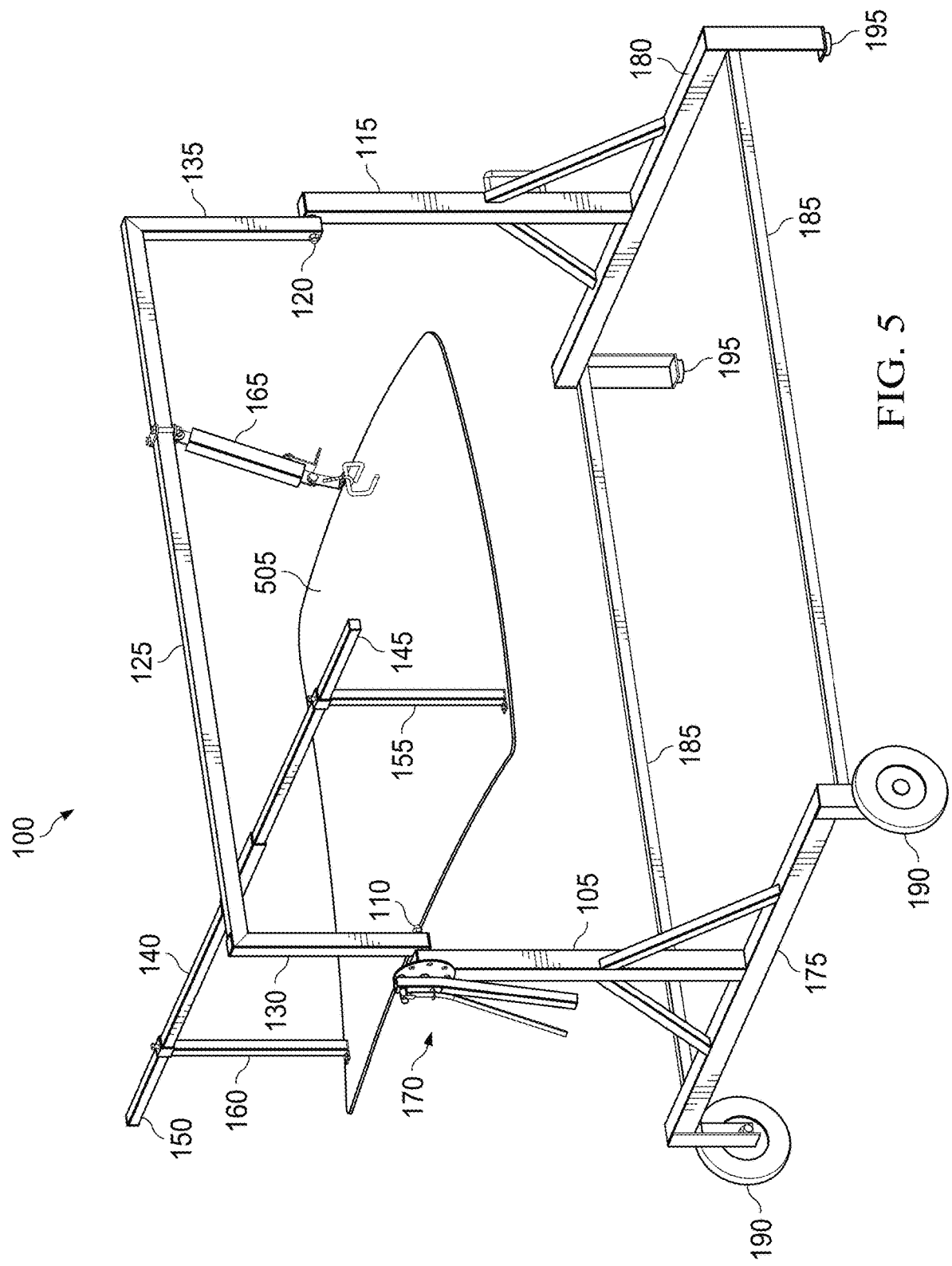
FIG. 5 is another perspective view of the apparatus of FIG. 1 with a vehicle part.

FIG. 5 is another perspective view of the apparatus 100 of FIG. 1, illustrating additional details that may be associated with some embodiments in use. For example, a vehicle part 505 is coupled to the apparatus 100 of FIG. 5. The apparatus 100 may be particularly advantageous for use with a vehicle part that is large and somewhat flat, such as a vehicle body panel. More particularly, the vehicle part 505 of FIG. 5 may be a vehicle body panel, such as a hood, trunk lid, hatch, or other hinge-mounted panel. Such panels are typically fabricated with various mechanisms for attachment to the rest of a vehicle. For example, a hood may have a pair of apertures for attaching hinges. A hood may also have a latch or hook configured to secure the opposite end of the hood to a frame of a vehicle.

The vehicle part 505 may be coupled to the apparatus 100 using any suitable process. For example, the vehicle part 505 of FIG. 5 may be mounted by placing the vehicle part 505 on a temporary support, such as a flat scissor bench (not shown). One of the braces 185 may be removed, and the support with the vehicle part 505 may be positioned below the support beam 125. The first mount 155 and the second mount 160 may be adjusted to the size of the vehicle part 505. The vehicle part 505 may then be coupled to the first mount 155 and the second mount 160. For example, if the vehicle part 505 is a hood, the first mount 155 and the second mount 160 may be bolted on the same way the hood would be bolted onto the hinges of a vehicle. The third mount 165 may also be aligned to a suitable connection point and coupled to the vehicle part 505. For example, the third mount 165 may be bolted to the vehicle part 505 in the same way as a latch connects to a hood with a J bolt. The temporary support then may be removed, and the brace 185 may be reattached.

In some embodiments, the apparatus 100 with the vehicle part 505 may be moved from a first location to a second location. For example, the apparatus 100 and the vehicle part 505 may be wheeled from a work bay to a paint booth. More generally, in some embodiments, two wheels on one end and two rubber feet on the other provide stability to the apparatus 100 while also provide mobility on different terrain. For example, the apparatus 100 may be readily moved from a gravel driveway to a concrete shop floor.

When installed as shown in the example of FIG. 5, the vehicle part 505 is in a substantially flat position, which may be particularly advantageous for painting and can allow the paint to look seamless with no runs. The actuator 170 may be operated to rotate the vehicle part 505 to other desirable orientations.

Figure 6:
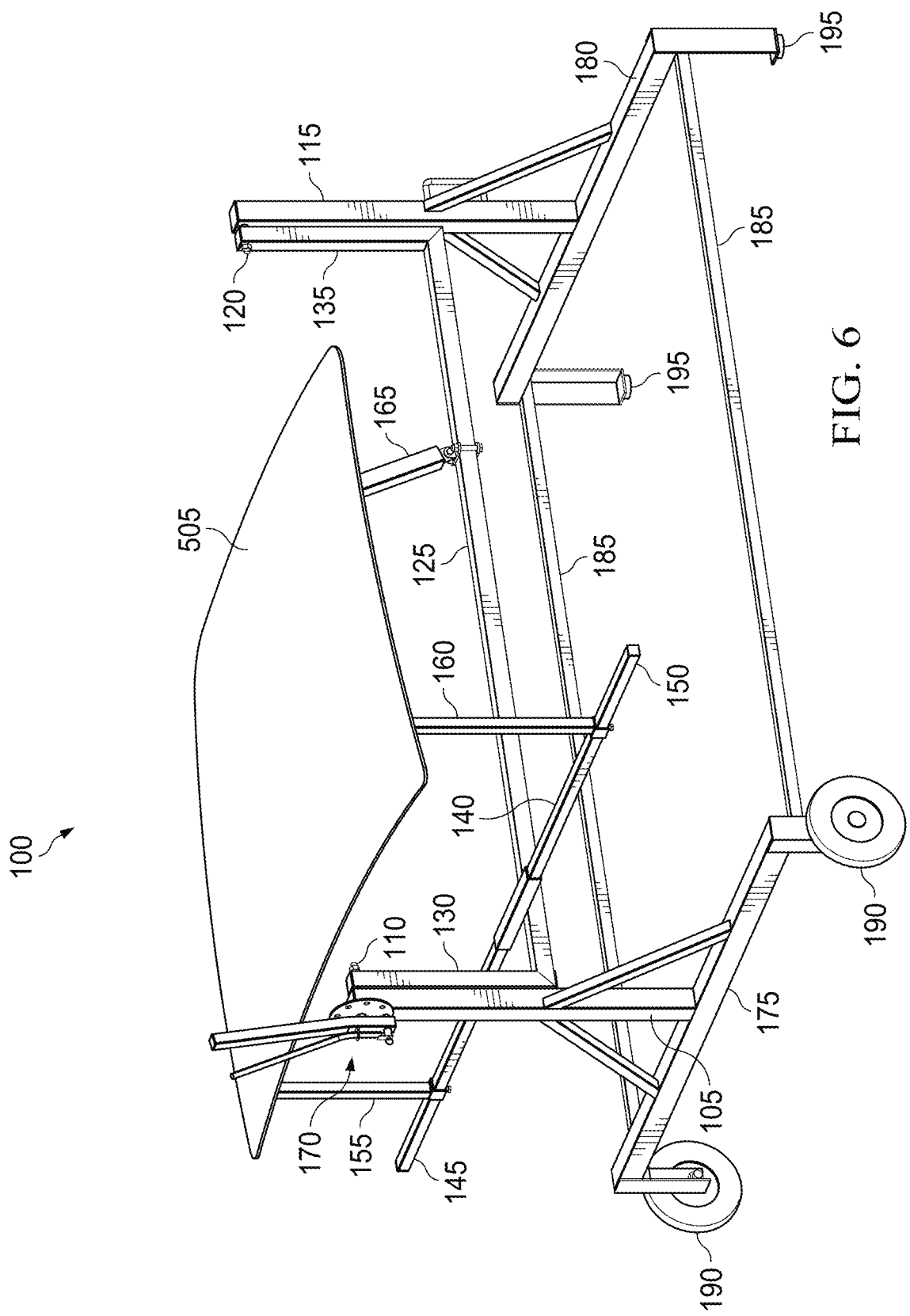
FIG. 6 illustrates the apparatus of FIG. 5 in a second configuration.

FIG. 6, for example, illustrates the apparatus 100 of FIG. 5 in a second configuration. More particularly, the actuator 170 of FIG. 5 has been operated to rotate the vehicle part 505 one hundred eighty degrees around the axis defined by the shaft 110 and the spindle 120. In general, the apparatus 100 of FIG. 6 can allow the vehicle part 505 to be rotated three hundred sixty degrees about the axis defined by the shaft 110 and the spindle 120. Additionally, or alternatively, the actuator 170 can allow the vehicle part 505 to be locked in at discrete rotation angles corresponding to the index stops 425, such as a 90-, 45-, or 180-degree (flat) angle. Rotating the vehicle part 505 before the paint dries can allow for a complete paint job in one session, which may be particularly advantageous. Doing so can allow the vehicle part 505 to be painted without taping off sections, which can save materials, improve aesthetic, and increase productivity.

The systems, apparatuses, and methods described herein may provide significant advantages, some of which have been described above. For example, some embodiments may allow a single operator to manipulate large vehicle parts to access all sides with minimal effort, which can save both time and money. Additionally, or alternatively, some embodiments can be easily moved while maintaining stability, and can be adjusted readily to vehicle parts having a variety of sizes and shapes. Some embodiments may be particularly advantageous for painting body panels from most automobiles, including antique automobiles, and can be adjusted for hoods, trunk lids, and rear hatches on minivans or sport utility vehicles. Such advantages, alone or in combination, can significantly reduce the labor, and therefore the cost, associated with vehicle repair and restoration. While described primarily in the context of vehicle parts, such systems, apparatuses, and methods may find application in a variety of other contexts and applications for manipulating relatively large objects, particularly for painting, repair, or restoration.

While shown in a few illustrative embodiments, a person having ordinary skill in the art will recognize that the systems, apparatuses, and methods described herein are susceptible to various changes and modifications that fall within the scope of the appended claims. Moreover, descriptions of various alternatives using terms such as "or" do not require mutual exclusivity unless clearly required by the context, and the indefinite articles "a" or "an" do not limit the subject to a single instance unless clearly required by the context. Components may also be combined or eliminated in various configurations for purposes of sale, manufacture, assembly, or use. For example, in some configurations, the support beam 125 and the mounting beam 140 may each be separated from one another or combined in various ways for manufacture or sale. Additionally, or alternatively, a variety of mounts or other attachment mechanisms may be manufactured and sold separately to customize or adapt the systems, apparatuses, and methods for particular applications.

The claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims.

What is claimed is:

1. An apparatus for rotating a vehicle part, the apparatus comprising:
   a first strut comprising a shaft;
   a second strut comprising a spindle;
   a support beam comprising a first end coupled to the shaft and a second end coupled to the spindle;
   a mounting beam comprising a first end and a second end, the mounting beam coupled to the support beam between the first end and the second end;
   a first mount coupled to a first portion of the mounting beam;
   a second mount coupled to a second portion of the mounting beam;
   a third mount coupled to the support beam; and
   an actuator comprising:
      a wheel coupled to the first strut, the wheel having a first index stop and a second index stop,
      a pivot arm coupled to the shaft,
      a latch configured to engage the first index stop to prevent the pivot arm from rotating the shaft, and
      a lever coupled to the latch, the lever configured to release the latch from the first index stop to allow the pivot arm to rotate the shaft until the latch engages the second index stop;
   wherein the first mount, the second mount, and the third mount are configured to be coupled to the vehicle part, and the actuator is configured to rotate the shaft so that the support beam rotates around the spindle, thereby rotating the vehicle part.

2. The apparatus of claim 1, wherein the latch comprises an index pin biased toward the wheel.

3. The apparatus of claim 1, wherein:
   the first mount is coupled to the mounting beam between the support beam and the first end of the mounting beam; and
   the second mount is coupled to the mounting beam between the support beam and the second end of the mounting beam.

4. The apparatus of claim 1, wherein the first mount, the second mount, or the third mount is a drop mount.

5. The apparatus of claim 1, further comprising a base coupled to the first strut and the second strut.

6. The apparatus of claim 1, wherein the first mount and the second mount are configured to slide along the mounting beam.

7. The apparatus of claim 1, wherein the third mount is configured to slide along the support beam.

8. The apparatus of claim 1, wherein the support beam is rotatable around the spindle three hundred sixty degrees.

9. An apparatus for rotating a vehicle part, the apparatus comprising:
- a frame comprising a shaft and a spindle;
- a support beam comprising a first end coupled to the shaft and a second end coupled to the spindle;
- one or more mounts coupled to the support beam and configured to be coupled to the vehicle part;
- a wheel coupled to the frame, the wheel having a first index stop and a second index stop;
- a pivot arm coupled to the shaft;
- a latch configured to engage the first index stop to prevent the pivot arm from rotating the shaft; and
- a lever coupled to the latch, the lever configured to release the latch from the first index stop to allow the pivot arm to rotate the shaft until the latch engages the second index stop.

10. The apparatus of claim 9, wherein the latch comprises an index pin biased toward the wheel.

* * * * *